(12) United States Patent
Yoo et al.

(10) Patent No.: US 11,672,253 B2
(45) Date of Patent: Jun. 13, 2023

(54) ANTIBACTERIAL SURFACE TREATED COPPER MATERIAL AND A METHOD FOR PREPARING THE SAME

(71) Applicants: HYUNDAI MOTOR COMPANY, Seoul (KR); KIA CORPORATION, Seoul (KR)

(72) Inventors: Chang Yeol Yoo, Suwon-si (KR); Jaesun Lim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 157 days.

(21) Appl. No.: 17/411,295

(22) Filed: Aug. 25, 2021

(65) Prior Publication Data
US 2022/0167624 A1   Jun. 2, 2022

(30) Foreign Application Priority Data
Nov. 30, 2020   (KR) .................... 10-2020-0164158

(51) Int. Cl.
| | |
|---|---|
| *A01N 59/20* | (2006.01) |
| *C23F 17/00* | (2006.01) |
| *C22C 9/04* | (2006.01) |
| *A01N 25/10* | (2006.01) |
| *C23G 1/00* | (2006.01) |
| *C23F 1/18* | (2006.01) |
| *C22F 1/08* | (2006.01) |

(52) U.S. Cl.
CPC ............ *A01N 59/20* (2013.01); *A01N 25/10* (2013.01); *C22C 9/04* (2013.01); *C23F 17/00* (2013.01); *C22F 1/08* (2013.01); *C23F 1/18* (2013.01); *C23G 1/00* (2013.01)

(58) Field of Classification Search
None
See application file for complete search history.

(56) References Cited

PUBLICATIONS

Qualitetch "Copper is helping kill superbugs", electronic article at qualitetch.com, published date of Aug. 20, 2019, retrieved on Mar. 23, 2023, retrieved from the internet: <URL:www.qualitetch.com/copper-is-helping-kill-superbugs/> (Year: 2019).*
Castrejon-Sanchez, "Thermal oxidation of copper over a broad temperature range: towards the formation of cupric oxide (CuO)", Materials Research Express, 6, pp. 1-9, Apr. 17, 2019 (Year: 2019).*

* cited by examiner

*Primary Examiner* — Robert T. Crow
*Assistant Examiner* — John P Nguyen
(74) *Attorney, Agent, or Firm* — Lempia Summerfield Katz LLC

(57) ABSTRACT

A manufacturing method of an antibacterial surface treated copper material includes: etching a metal base material including copper; primary heat-treating the metal base material; coating the metal base material with a composition for a coating; and secondary heat-treating the metal base material. The composition for the coating includes an acryl resin at 40 wt % to 50 wt % and CuO at 1 wt % to 5 wt % for an entire weight of the composition for the coating.

14 Claims, 3 Drawing Sheets

ANTIBACTERIAL SURFACE TREATED COPPER MATERIAL AND A METHOD FOR PREPARING THE SAME

CROSS-REFERENCE TO RELATED APPLICATION

This application claims priority to and the benefit of Korean Patent Application No. 10-2020-0164158 filed in the Korean Intellectual Property Office on Nov. 30, 2020, the entire contents of which are incorporated herein by reference.

BACKGROUND

(a) Field of the Disclosure

The present disclosure relates to an antibacterial surface treated copper material, and a manufacturing method thereof. More particularly, the present disclosure relates to a copper material having excellent antibacterial properties, a long antibacterial duration, and excellent durability, and a manufacturing method thereof.

(b) Description of the Related Art

Copper (Cu) is a metal with an antibacterial function similar to silver (Ag). In the vehicle field, application of copper to parts that can be touched, such as buttons, steering wheels, and door handles is being considered.

The principle that the copper metal has antibacterial properties is that copper atoms decompose a cell membrane of bacteria. Therefore, it is important that the copper atoms and cells are in direct contact. However, a copper metal has a problem of being easily discolored, so a coating layer is generally formed on copper. Because of this, copper atoms do not come into contact with bacteria, so the antibacterial properties do not appear.

In addition, when the thickness of the coating layer is formed in a nano unit to improve the antibacterial properties, there is a problem that the durability is deteriorated. Also, cupric oxide (CuO) that is stabilized on the copper surface by the coating layer exists and the number of $Cu^+$ decreases. Thus, there is a problem that the antibacterial duration time is very short.

The above information disclosed in this Background section is only to enhance understanding of the background of the disclosure. Therefore, the Background section may contain information that does not form the prior art that is already known in this country to a person of ordinary skill in the art.

SUMMARY

An object of the present disclosure is to provide an antibacterial surface treated copper material having excellent antibacterial properties, a long antibacterial duration time, and excellent durability.

Another object of the present disclosure is to provide a manufacturing method of the antibacterial surface treated copper material.

An embodiment of the present disclosure provides a manufacturing method of an antibacterial surface treated copper material. The method includes: etching a metal base material including copper; primary heat-treating the metal base material; coating the metal base material with a composition for a coating; and secondary heat-treating the metal base material. The composition for the coating includes an acryl resin at 40 wt % to 50 wt % and CuO at 1 wt % to 5 wt % for an entire weight of the composition for the coating.

The metal base material including copper may be brass including copper (Cu) at 65 wt % to 75 wt %, and zinc (Zn) at 25 wt % to 35 wt % for the entire weight of the metal base material.

The etching may be performed for 1 minute to 10 minutes by using hydrogen chloride (HCl) at a 0.5 N to 3 N concentration.

The primary heat treatment may be performed at 150° C. to 200° C. for 1 hour to 2 hours.

The manufacturing method further includes degreasing the metal base material between the primary heat treatment of the metal base material and the coating of the metal base material with the composition for the coating.

The degreasing may be performed for 10 seconds to 10 minutes by using a sodium phosphate ($Na_3PO_4$) aqueous solution of 25 g/l to 35 g/l.

The composition for the coating may further include a cyclohexanone solvent at 10 wt % to 15 wt %, a melamine hardening agent at 10 wt % to 20 wt %, an aromatic solvent at 5 wt % to 10 wt %, silicon dioxide ($SiO_2$) at 10 wt % to 15 wt %, and a phenol resin at 1 wt % to 5 wt % for the entire weight of the composition for the coating.

The coating may be performed by coating the composition for the coating for 1 minute to 10 minutes and drying at 100° C. to 200° C. for 30 minutes to 60 minutes.

The secondary heat treatment may be performed at 100° C. to 150° C. for 1 hour to 2 hours.

Another embodiment of the present disclosure provides an antibacterial surface treated copper material. The material includes a metal base material including copper and a coating layer positioned on the metal base material. The coating layer includes an acryl resin at 50 wt % to 65 wt % and CuO at 1.5 wt % to 5 wt % for the entire weight of the coating layer.

The coating layer may further include a melamine hardening agent at 15 Alt % to 20 wt %, $SiO_2$ at 15 wt % to 20 wt %, and a phenol resin at 1.5 wt % to 5 wt % for the entire weight of the coating layer.

The thickness of the coating layer may be 15 μm or less.

A metal oxide layer including CuO may not be formed between the metal base material and the coating layer.

The metal oxide layer may be removed by etching.

The antibacterial surface treated copper material of the present disclosure has excellent antibacterial properties, a long antibacterial duration time, and excellent durability.

DETAILED DESCRIPTION OF THE EMBODIMENTS

Advantages and features of the technology described herein, and a method for achieving them, should become apparent with reference to embodiments described below in detail together with the accompanying drawings.

However, implemented forms may not be limited to the embodiments disclosed below. Although not specifically defined, all terms including technical and scientific terms used herein have meanings understood by persons having ordinary skill in the art. The terms have specific meanings coinciding with related technical references and the present specification as well as lexical meanings. In other words, the terms are not to be construed as having idealized or formal meanings.

In addition, unless explicitly described to the contrary, the word "comprise", and variations such as "comprises" or "comprising", should be understood to imply the inclusion of stated elements but not the exclusion of any other elements.

In addition, the terms of a singular form may include plural forms unless referred to the contrary.

A manufacturing method of an antibacterial surface treated copper material according to an embodiment of the present disclosure includes etching a metal base material including copper, primary heat-treating the metal base material, coating the metal base material with a coating composition, and secondary heat-treating the metal base material.

Figure 1:
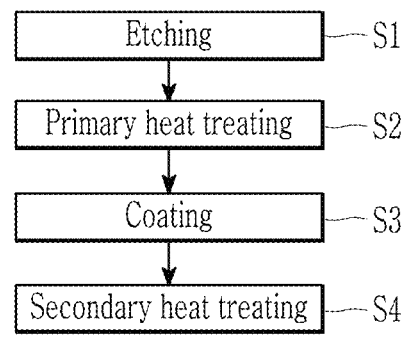
FIG. 1 is a process flowchart showing a manufacturing method of an antibacterial surface treated copper material according to an embodiment.

FIG. 1 is a process flowchart showing a manufacturing method of an antibacterial surface treated copper material according to an embodiment. Now, the manufacturing method of the antibacterial surface treated copper material is described in detail with reference to FIG. 1.

First, a metal base material including copper is etched (S1).

The metal base material including the copper may be brass including copper (Cu) at 65 wt % to 75 wt % and zinc (Zn) at 25 wt % to 35 wt % for the entire weight of the metal base material.

The metal base material may be cleansed by water before the etching.

The etching is to facilitate the dissolution of copper ions (Cu) from the surface of the metal base material. Specifically, when the metal base material is etched with acid, the metal oxide layer including CuO existing on the surface of the metal base material may be removed, the surface area may be enlarged, and then unstable $Cu^+$ may be generated through heat treatment.

The acid may include HCl, sulfuric acid ($HSO_4$), nitric acid ($HNO_3$), or a combination thereof.

The etching may be performed for 1 minute to 10 minutes by using HCl at a 0.5 N to 3 N concentration or for 1 minute to 2 minutes by using HCl at a 2 N to 3 N concentration. If the concentration of HCl is less than 0.5 N, the metal oxide layer may not be removed, and if the concentration exceeds 3 N, the metal base material surface as well as the metal oxide layer may be corroded and damaged. If the etching time is less than 1 minute, only some oxide film may be removed, and if the etching time exceeds 10 minutes, the metal surface may be corroded.

The etching-processed metal base material is primary heat-treated (S2).

If the etched metal base material is primary heat-treated, unstable $Cu^+$ may be generated on the surface of the metal base material.

The primary heat treatment may be performed at 150° C. to 200° C. for 1 hour to 2 hours. If the primary heat treatment temperature is less than 150° C., $Cu^+$ may not be generated, and if the temperature exceeds 200° C., CuO may be generated as well as $Cu^+$. If the primary heat treatment time is less than 1 hour, a small amount of $Cu^+$ may be generated, and if the time exceeds 2 hours, CuO may be generated as well as $Cu^+$.

Between the primary heat treatment (S2) of the metal base material and the coating (S3) of the metal base material with the coating composition, the method may further include degreasing the metal base material.

The degreasing may be performed for 10 seconds to 10 minutes, specifically 1 minute to 3 minutes, using a $Na_3PO_4$ aqueous solution at 25 g/l to 35 g/l.

After the degreasing, the method may further include washing the metal base material with water for 1 minute to 3 minutes.

Next, the metal base material is coated with the coating composition (S3).

The composition for the coating may include acryl resin at 40 wt % to 50 wt % and CuO at 1 wt % to 5 wt % for the entire weight of the composition for the coating. When the composition for the coating includes CuO in an amount of less than 1 wt %, the antibacterial effect may be insignificant due to low $Cu^+$ generation, and if the amount exceeds 5 wt %, brittleness and cracks may result.

The composition for the coating may further include a cyclohexanone solvent at 10 wt % to 15 wt %, a melamine hardening agent at 10 wt % to 20 wt %, an aromatic solvent at 5 wt % to 10 wt %, $SiO_2$ at 10 wt % to 15 wt %, and a phenol resin at 1 wt % to 5 wt % for the entire weight of the composition for the coating.

The coating may be performed by contacting the composition for the coating with the metal base material for 1 minute to 10 minutes, specifically 1 minute to 5 minutes, and then drying at 100° C. to 200° C. for 30 minutes to 60 minutes.

The method for contacting the composition for the coating with the metal base material is not limited in the present disclosure, and as an example, the composition for the coating may be coated on one surface, both surfaces of the metal base material, or the entire surface, or contacting the composition with the base material may be achieved by dipping the metal base material into the composition for the coating.

If the drying temperature is less than 100° C., the coating may not be dried and the coating layer may not be formed, and if the drying temperature exceeds 200° C., the coating may be over-dried and cracks may occur in the coating layer. If the drying time is less than 30 minutes, the coating thickness may be insufficient, and if the drying time exceeds 60 minutes, cracks may occur in the coating layer.

After the coating and before the drying, the method may further include washing the metal base material with water for 1 minute to 3 minutes.

The coated metal base material is treated with secondary heat (S4).

The secondary heat treatment is to form $Cu^+$ on the coating layer surface.

The secondary heat treatment may be performed at 100° C. to 150° C. for 1 hour to 2 hours.

If the secondary heat treatment temperature is less than 100° C., $Cu^+$ may not be generated, and if the temperature exceeds 150° C., CuO may be generated as well as $Cu^+$. If the secondary heat treatment time is less than 1 hour, the amount of Cu may be insufficient, and if the time exceeds 2 hours, CuO may be generated as well as $Cu^+$.

Antibacterial properties suppress a proliferation of bacteria by eluting copper ions ($Cu^+$) and destroying a cell membrane. In the copper material, $Cu^+$ on the surface reacts with air over a time to form the stable CuO, and $Cu^+$ is not eluted.

The present disclosure improves the antibacterial function firstly by removing the metal oxide layer including CuO by etching the metal base material surface including copper, and elute a substantial amount of $Cu^+$ by secondly adding CuO to the coating layer to increase the amount of $Cu^+$.

Specifically, the surface is etched with HCl to remove CuO and increase the surface area so that the copper ions are well eluted, and then unstable $Cu^+$ is generated through the heat treatment and the coating added with CuO is heat-treated to generate $Cu^+$ on the surface. In other words, the antibacterial properties are further improved through $Cu^+$ of the copper base material itself and $Cu^+$ of the coating layer.

The antibacterial surface treated copper material according to another embodiment of the present disclosure includes a metal base material including copper, and a coating layer positioned on the metal base material.

Since the description of the metal base material is the same as described above, a repeated description is omitted.

The coating layer is formed by coating the composition for the coating and then drying, and thus the composition for the coating may include the same solid content except for the solvent.

In other words, the coating layer may include the acryl resin at 50 wt % to 65 wt % and CuO at 1.5 wt % to 5 wt % for the coating layer entire weight, and additionally may include the melamine hardening agent at 15 wt % to 20 wt %, $SiO_2$ at 15 wt % to 20 wt %, and the phenol resin at 1.5 wt % to 5 wt %.

The thickness of the coating layer may be 15 μm or less, for example 10 μm or less, or 3 μm or less, and 1 μm or more, for example 1 μm to 3 μm. The copper material further improves the antibacterial properties through $Cu^+$ of the copper base material itself and $Cu^+$ of the coating layer, and the durability of the coating layer may be ensured when the thickness is 1 μm or more.

As described above, as the metal base material is etched, the metal oxide layer including CuO may not be included between the metal base material and the coating layer. In other words, the metal oxide layer may be removed by the etching.

Hereinafter, specific embodiments of the disclosure are presented. However, the embodiments described below are only for specifically illustrating or describing the disclosure, and the scope of the disclosure is not limited thereto.

[Manufacturing Example: Manufacturing of an Antibacterial Surface Treated Copper Material]

Embodiment 1

The brass base material (Cu 70 wt %, Zn 30 wt %) was etched by HCl at a 0.8 N concentration for 2 minutes.

The etched brass base material was subjected to primary heat treatment at 200° C. for 1 hour.

The primary heat-treated brass base material was degreased with 30 WI $Na_3PO_4$ for 2 minutes and washed with water for 2 minutes.

The composition for the coating including a cyclohexanone solvent at 12 wt %, a melamine hardening agent at 15 wt %, an acryl resin at 45 wt %, an aromatic solvent at 8 wt %, $SiO_2$ at 14 wt %, CuO at 3 wt %, and a phenol resin at 3 wt % was coated on the primary heat-treated brass base material surface for 5 minutes and dried at 150° C. for 45 minutes. At this time, the thickness of the formed coating layer was 2 μm.

Thereafter, the brass base material on which the coating layer was formed was subjected to the secondary heat treatment at 150° C. for 2 hours.

Embodiment 2

Except for using the composition for the coating including the cyclohexanone solvent at 12 wt %, the melamine hardening agent at 15 wt %, the acryl resin at 45 wt %, the aromatic solvent at 8 wt %, $SiO_2$ at 10 wt %, CuO at 7 wt %, and the phenol resin at 3 wt %, the copper material is manufactured by the same method as that of Embodiment 1.

Comparative Example 1

The brass base material (Cu at 70 wt %, Zn at 30 wt %) is degreased by $Na_3PO_4$ at 30 g/l for 2 minutes and washed with water for 2 minutes.

The composition for the coating including the cyclohexanone solvent at 12 wt %, the melamine hardening agent at 15 wt %, the acryl resin at 45 wt %, the aromatic solvent at 8 wt %, $SiO_2$ at 17 wt %, and the phenol resin at 3 wt % was coated on the primary heat-treated brass base material surface for 5 minutes and dried at 150° C. for 45 minutes. At this time, the thickness of the formed coating layer was 0.5 μm.

Experimental Example 1: Surface Measuring of a Manufactured Copper Material

Figure 2:
FIG. 2 is a photograph of a surface observed by a scanning electron microscope (SEM) for a copper material prepared in Embodiment 1.
Figure 3:
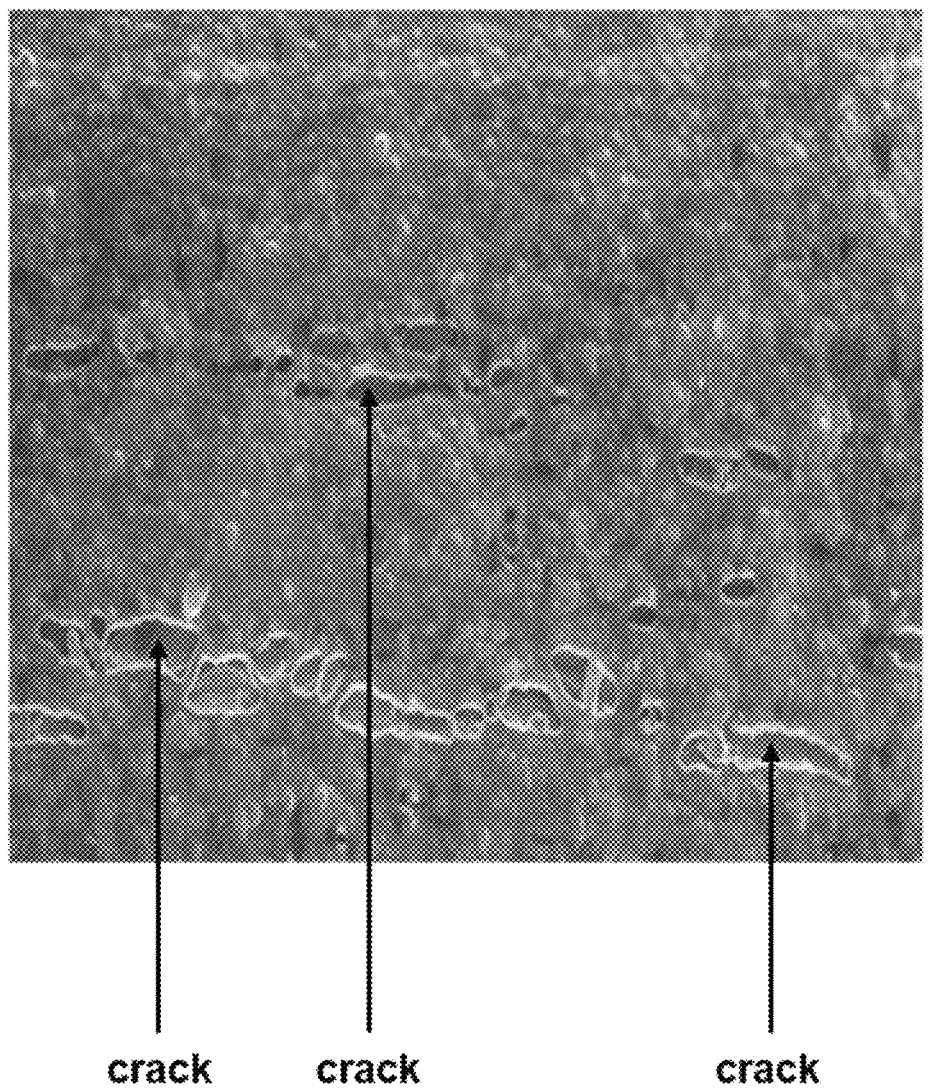
FIG. 3 is a photograph of a surface observed by a scanning electron microscope (SEM) for a copper material prepared in Embodiment 2.

The surface of the copper material manufactured in Embodiment 1 and Embodiment 2 was observed with a scanning electron microscope (SEM), and the results are shown in FIG. 2 and FIG. 3.

Referring to FIG. 2 and FIG. 3, if the content of CuO in the composition for the coating exceeds 5 wt %, cracks may occur on the copper material surface due to brittleness.

Experimental Example 2: Antibacterial Property Evaluation of a Manufactured Copper Material The antibacterial properties of the copper material prepared in Embodiment 1 and Comparative Example 1 were evaluated through an *E. coli* culture test, and the results are summarized in Table 1.

Specifically, *E. coli* was placed on a copper material of a 50 mm×50 mm size, a film of 40 mm×40 mm size was adhered, and left for 24 hours, and the number of bacteria was measured.

TABLE 1

| | E. coli culture antibacterial test (KS 0693, AATCC 100) | | | | | |
|---|---|---|---|---|---|---|
| | Embodiment 1 | | | Comparative Example 1 | | |
| Experimental result | Initial concentration (CFU/mL) | Concentration after 24 hours (CFU/mL) | Reduction rate (%) | Initial concentration (CFU/mL) | Concentration after 24 hours (CFU/mL) | Reduction rate (%) |
| Reference | $3.7 \times 10^5$ | $9.5 \times 10^5$ | — | $3.7 \times 10^5$ | $9.5 \times 10^5$ | — |
| Plate sample | $3.7 \times 10^5$ | <10 | 99.9 | $3.7 \times 10^5$ | $1.6 \times 10^5$ | 83.1 |

Referring to Table 1, the copper material prepared in Comparative Example 1 exhibited an antibacterial efficiency of 83.1%, but the copper material prepared in Embodiment 1 exhibited an antibacterial efficiency of 99.9%.

While this disclosure has been described in connection with what is presently considered to be practical embodiments, it should understood that the disclosure is not limited to the disclosed embodiments. On the contrary, the disclosure is intended to cover various modifications and equivalent arrangements included within the spirit and scope of the appended claims.

What is claimed is:

1. A manufacturing method of an antibacterial surface treated copper material, the manufacturing method comprising:
    etching a metal base material including copper;
    primary heat-treating the metal base material;
    coating the metal base material with a composition for a coating; and
    secondary heat-treating the metal base material,
    wherein the composition for the coating includes an acryl resin at 40 wt % to 50 wt % and CuO at 1 wt % to 5 wt % for an entire weight of the composition for the coating.
2. The manufacturing method of claim 1, wherein
    the metal base material including copper is a brass including copper (Cu) at 65 wt % to 75 wt % and zinc (Zn) at 25 wt % to 35 wt % for the entire weight of the metal base material.
3. The manufacturing method of claim 1, wherein
    the etching is performed for 1 minute to 10 minutes by using HCl at a 0.5 N to 3 N concentration.
4. The manufacturing method of claim 1, wherein
    the primary heat treatment is performed at 150° C. to 200° C. for 1 hour to 2 hours.
5. The manufacturing method of claim 1, further comprising
    degreasing the metal base material after the primary heat treatment of the metal base material and before the coating of the metal base material with the composition for the coating.
6. The manufacturing method of claim 5, wherein
    the degreasing is performed for 10 seconds to 10 minutes by using a $Na_3PO_4$ aqueous solution of 25 g/l to 35 g/l.
7. The manufacturing method of claim 1, wherein
    the composition for the coating further includes a cyclohexanone solvent at 10 wt % to 15 wt %, a melamine hardening agent at 10 wt % to 20 wt %, an aromatic solvent at 5 wt % to 10 wt %, $SiO_2$ at 10 wt % to 15 wt %, and a phenol resin at 1 wt % to 5 wt % for the entire weight of the composition for the coating.
8. The manufacturing method of claim 1, wherein
    the coating is performed by coating the composition for the coating for 1 minute to 10 minutes and drying at 100° C. to 200° C. for 30 minutes to 60 minutes.
9. The manufacturing method of claim 1, wherein
    the secondary heat treatment is performed at 100° C. to 150° C. for 1 hour to 2 hours.
10. An antibacterial surface treated copper material comprising:
    a metal base material including copper; and
    a coating layer positioned on the metal base material,
    wherein the coating layer includes an acryl resin at 50 wt % to 65 wt % and CuO at 1.5 wt % to 5 wt % for the entire weight of the coating layer.
11. The antibacterial surface treated copper material of claim 10, wherein
    the coating layer further includes a melamine hardening agent at 15 wt % to 20 wt %, $SiO_2$ at 15 wt % to 20 wt %, and a phenol resin at 1.5 wt % to 5 wt % for the entire weight of the coating layer.
12. The antibacterial surface treated copper material of claim 10, wherein
    the thickness of the coating layer is 15 µm or less.
13. The antibacterial surface treated copper material of claim 10, wherein
    a metal oxide layer including CuO is not disposed between the metal base material and the coating layer.
14. The antibacterial surface treated copper material of claim 10, wherein
    a metal oxide layer including CuO between the metal base material and the coating layer is removed by etching.

* * * * *